United States Patent

[11] 3,613,952

| [72] | Inventors | Roger Gilmont<br>Douglaston, N.Y.;<br>Raymond E. Portyrata, North Haven, Conn. |
|------|-----------|---|
| [21] | Appl. No. | 31,088 |
| [22] | Filed | Apr. 23, 1970 |
| [45] | Patented | Oct. 19, 1971 |
| [73] | Assignee | Cole Parmer Instrument Company<br>Chicago, Ill. |

[54] FLUID DISPENSER WITH ADJUSTABLE STROKE PISTON AND REGISTER
18 Claims, 4 Drawing Figs.

| [52] | U.S. Cl. | 222/43, 222/309 |
|------|----------|---|
| [51] | Int. Cl. | B67d 5/22 |
| [50] | Field of Search | 222/23-29, 43, 46, 47, 309 |

[56] References Cited
UNITED STATES PATENTS

| 2,660,342 | 11/1953 | Ruf | 222/309 |
|-----------|---------|-----|---------|
| 3,013,435 | 12/1961 | Rodrigues, Jr. | 222/309 X |
| 3,261,509 | 7/1966 | Shevell | 222/309 |
| 3,334,788 | 8/1967 | Hamilton | 222/43 |

Primary Examiner—Samuel F. Coleman
Attorney—James and Franklin

ABSTRACT: A digital dispenser comprises a cylinder-plunger assembly for accurately dispensing a measured amount of fluid from said cylinder. A rotatable screw jack is adapted to adjust the position of a stop member to define the length of the plunger stroke. A numbered wheel assembly is operatively connected to the screw jack through a rotatable knob whereby the stroke is set by rotating the knob and the desired volume appears on the numbered wheel assembly as a digital readout.

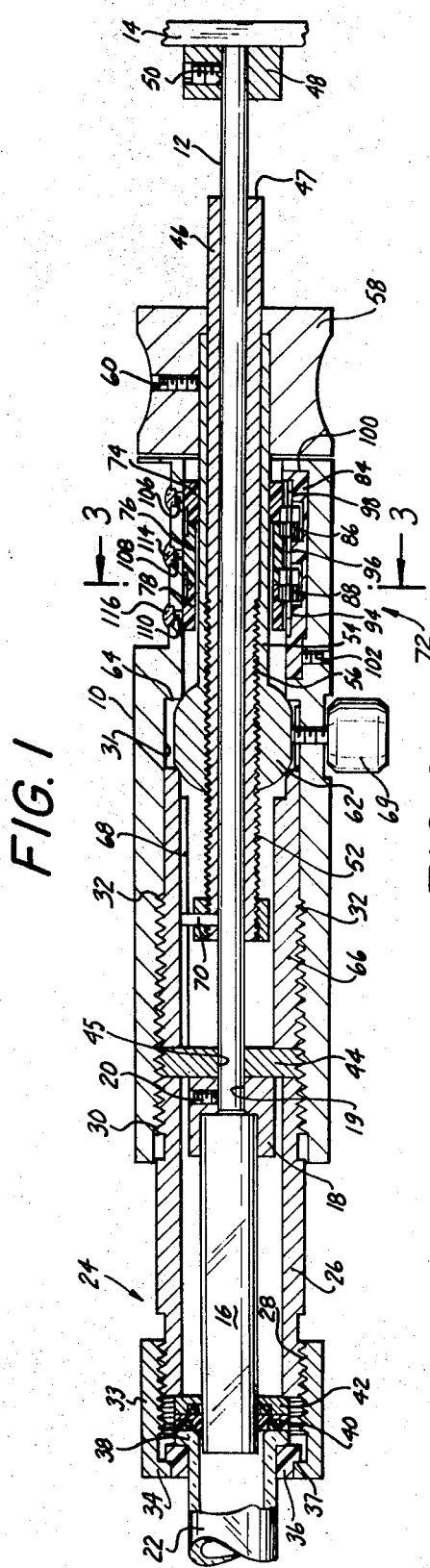
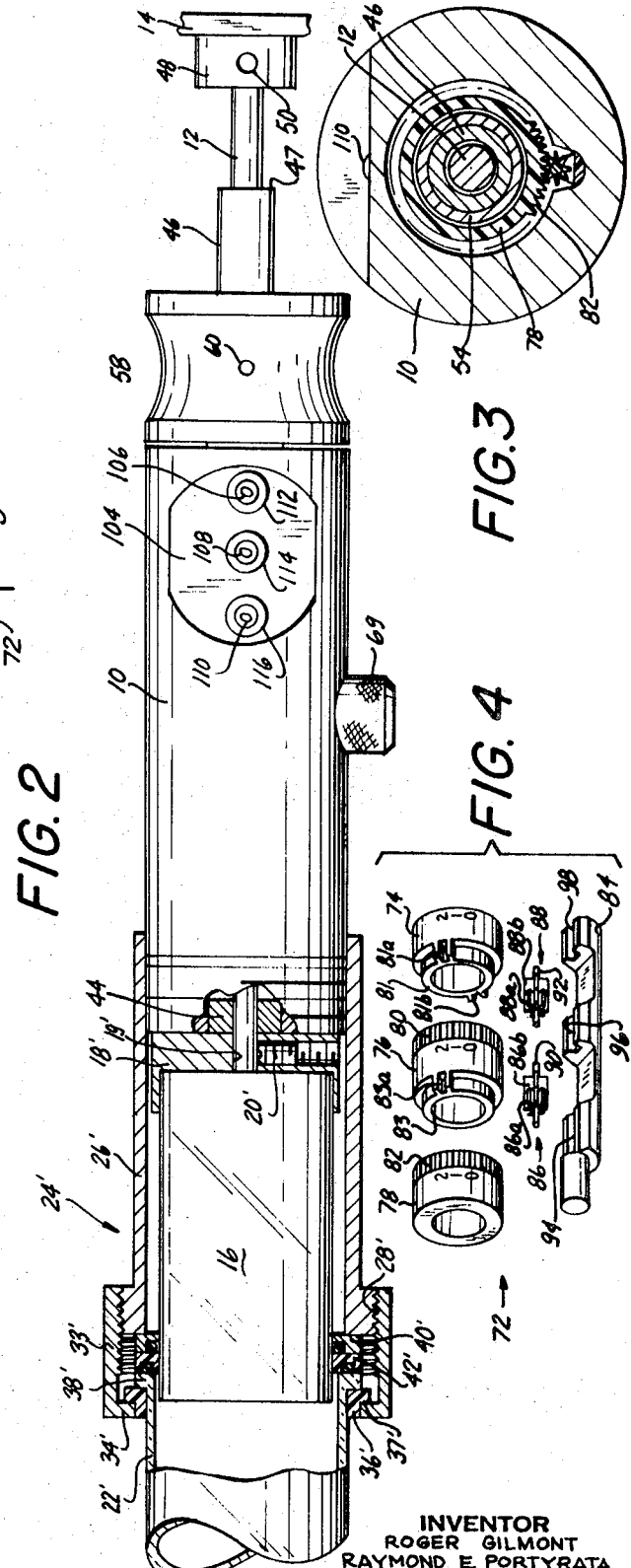
FIG. 1
FIG. 2
FIG. 3
FIG. 4
INVENTOR
ROGER GILMONT
RAYMOND E. PORTYRATA
BY *James and Franklin*
ATTORNEY

FLUID DISPENSER WITH ADJUSTABLE STROKE PISTON AND REGISTER

The present invention relates to a digital dispenser designed to produce repeatable delivery of fluids in accurately-controlled amounts, with means being provided for precisely varying the amount of liquid to be dispensed in accordance with a digital readout.

It is often required, both in production installations and in laboratories, that rapid repeatable dispensing of a predetermined volume of liquid be accomplished with the precise amount needed varying from time to time. Dispensing devices of the type described capable of achieving these results are commercially available, but they are in general expensive and unduly complex and are subject to various sources of inaccuracy.

It is a prime object of the present invention to design a plunger type liquid dispenser which will, when actuated, dispense accurately predetermined amounts of liquid, with the amount of liquid to be dispensed being readily and accurately adjustable in accordance with a digital readout, all by means of a structure which is extremely simple, reliable and inexpensive.

It is a further object of the present invention to provide a liquid dispenser in which a digital readout calibrated to precisely indicate the amount of liquid to be dispensed is directly responsive to the adjustment of the plunger stroke.

It is still a further object of the present invention to design a digital dispenser for dispensing accurately predetermined amounts of liquid which is simple, compact and readily adapted for use with a variety of laboratory or commercial equipment.

The digital dispenser of the present invention is of the plunger-cylinder type and comprises a plunger assembly adapted to be received at one end of a cylinder. The cylinder generally comprises the upper test tube like portion of a buret assembly. When the plunger assembly is thus received on the cylinder end, the plunger is adapted to extend into and be slidingly received within the cylinder.

The plunger assembly is enclosed in a casing and comprises a plunger rod operatively connected to the plunger and adapted to be actuated by a handle at the end of the rod extending from the casing. Stop means are provided at either end of the plunger rod for defining a given maximum stroke of the plunger, one of said stop means being adapted to engage an adjustable screw jack mechanism. A knob is provided at one end of the casing operatively connected to a hollow, internally threaded shaft which, in turn, is adapted to actuate the screw jack mechanism. A numbered wheel assembly is mounted on the hollow shaft so that rotation of the knob to adjust the plunger stroke is directly transmitted to the numbered wheel assembly to provide a digital readout accurately corresponding to the amount of liquid to be dispensed by a said given plunger stroke. Because the wheel assembly is mounted directly on the mechanism which adjusts the plunger stroke, the digital readout is an extremely accurate representation of the length of the plunger stroke which has been set.

The screw jack mechanism utilized to adjust the plunger stroke comprises means for accurately translating the knob rotation into linear movement of the adjustable stop means. As specifically disclosed, the mechanism comprises an externally threaded hollow shaft mounted concentrically on the plunger rod and adapted to threadingly engage an internally threaded hollow shaft mounted concentrically thereon. The internally threaded shaft is operatively connected at one end to the adjusting knob and is provided at the other end with a bulbous portion extending radially outwardly and adapted to be retained by said casing against linear movement along the axis of the plunger rod. The externally threaded shaft extends out of said casing in a direction towards said handle and is adapted to operatively engage a stop member extending from said handle to limit the dispensing stroke of the plunger. Means are provided for preventing rotation of said externally threaded shaft on said plunger rod with respect to the casing.

Thus rotation of the adjusting knob is transformed through the internally threaded shaft into axial movement of the externally threaded shaft by virtue of the threaded engagement therebetween. Means are provided for preventing the rotation of the internally threaded member after the plunger stroke has been adjusted so as to avoid any movement of the screw jack mechanism during movement of the plunger, thereby to assure consistently accurate repetitive strokes at a given digital setting.

To the accomplishment of the above, and to other objects as may hereinafter appear, the present invention relates to the construction of an adjustable volume digital dispenser as defined in the appended claims and as described in this specification taken together with the accompanying drawings in which:

FIG. 1 is a cross-sectional view of the embodiment of the dispenser of the present invention showing the plunger stroke adjustment and digital readout mechanisms.

FIG. 2 is a partial cross-sectional view of the dispenser of the present invention showing a different size plunger and showing the position of the digital readout on the casing.

FIG. 3 is a cross-sectional view of the numbered wheel assembly taken through the line 3—3 of FIG. 1.

FIG. 4 is an expanded perspective view of the numbered wheel assembly and associated gearing.

The dispenser is here illustrated and described in connection with two embodiments, that shown in FIG. 1 being adapted to dispense liquid in an amount from 0 to 1 ml. and that shown in FIG. 2 being adapted to dispense from 0 to 10 ml. of liquid. It should be noted that the present dispenser may be modified to dispense any amount of liquid, the accuracy of course being dependent upon the maximum capacity of the device.

The dispenser illustrated in FIG. 1 comprises a cylindrical casing 10 within which a plunger rod 12 is slidably mounted. Rod 12 carries a handle 14 (only a fragment shown) at one end and a plunger 16 at its other end. Plunger 16 is preferably a precision ground glass cylinder, one end of which is mounted in the cylindrical bore of a metallic press fitting 18. Fitting 18 is provided with an aperture 19 which is received on the end of plunger rod 12, the fitting 18 being rigidly secured thereto by means of a set screw 20, thus operatively connecting plunger 16 to rod 12. Plunger 16 is adapted to be received within an open ended glass barrel 22. In the usual case, barrel 22 will comprise the upper receiving end of a conventional buret assembly (not shown) from which a measured amount of fluid is to be dispensed. To this end, an adapter assembly, generally designated 24 designed to operatively connect casing 10 to barrel 22 is provided. Assembly 24 comprises a plunger casing 26 externally threaded at both ends as indicated at 28 and 30. Casing 10 is provided with a bore 31 having an internally threaded portion 32 adapted to threadingly engage threaded end 30 of plunger casing 26. An adapter fitting 33 is similarly internally threaded and engages threaded end 28 of plunger casing 26. Fitting 33 is provided with a shoulder 34 adapted to engage a split ring 36 having a mating shoulder 37 which in turn is adapted to be received on barrel 22. Barrel 22 is provided with a turned out flange 38 as is conventional. A washer 40 and a sealing ring 42 are slidably received on plunger 16, sealing ring 42 providing an effective fluid seal between the interior of casing 26 and the interior of barrel 22. To assemble the adapter 24, first fitting 33 an then split ring 36 are slipped on to barrel 22 over flange 38. Plunger casing 26 is then screwed into casing 10 and fitting 33 is screwed into plunger casing so that split ring 36 is pressed between fitting 33 and flange 38 of barrel 22, all as illustrated in FIG. 1.

Liquid is dispensed from barrel 22 by the axial movement of plunger 16 transmitted by the operator through handle 14 and rod 12. The plunger stroke is defined by stop means at either end of rod 12. A fixed stop member in the form of an externally threaded disk 44 threadingly engages casing 10 at its internally threaded portion 30. Disk 44 is provided with an aperture 45 through which rod 12 is slidably mounted. Disk 44 adapted to engage fitting 18 so as to limit the filling stroke of plunger 16 defined by its movement to the right. Plunger 16 is shown in FIG. 1 in its extreme right-hand cocked position with fitting 18 thus engaging disk 44.

The dispensing stroke is defined by an adjustable stop member in the form of a hollow shaft 46 slidably concentrically mounted on rod 12 and extending out from casing 10 to the right toward handle 14. A fitting 48 is fixedly mounted on rod 12 adjacent handle 14 by means of setscrew 50 and is adapted to engage the right-hand end 47 of shaft 46 to thereby limit the axial movement of plunger 16 to the left which defines the dispensing stroke. Handle 14 may be fixedly attached to or integral with fitting 48 in which case setscrew 50 serves to attach both members to rod 12. The stroke may thus be varied by adjusting the axial position of shaft 46 with respect to casing 10. To this end shaft 46 is provided with an externally threaded portion 52 remote from end 47. A sleeve 54 is concentrically, rotatably mounted on shaft 46 and is provided with an internally threaded portion 56 which cooperates with shaft 54 to define a screw jack mechanism. A knob 58 is mounted on sleeve 54 adjacent but spaced from casing 10 and is fixed thereto by setscrew 60. In order to provide screw jack action, sleeve 54, while rotatable with respect to shaft 46, must be axially stationary with respect to casing 10. To this end, sleeve 54 is provided with a bulbous protrusion 62 which is held within casing 10 against axial movement. Thus, protrusion 62 is wedged between shoulder 64 of bore 31 on one side and an externally threaded sleeve 66 threadedly mounted within casing 10 on the other side. As shown in FIG. 1, sleeve 66 in turn engages disk 44. Thus, it can be seen that when plunger casing 26 is tightened onto casing 10 in threaded engagement therewith, axial movement of disk 44, sleeve 66 and sleeve 54 is positively prevented. In order to accurately convert the rotational movement of sleeve 54 into axial movement of shaft 46 without lost motion, rotation of shaft 46 must be prevented. To this end, sleeve 66 is provided with an axially extending keyway 68 within which a key 70 rigidly mounted on shaft 46 is slidably received. It will now be apparent that the axial position of shaft 46 may be accurately adjusted by turning knob 60. The rotation of knob 60 is translated through sleeve 54 in screw jack fashion into a sliding axial movement of shaft 46 along plunger rod 12. Since sleeve 54 cannot move axially and since shaft 46 cannot rotate there is no inaccuracy due to lost motion.

In order to prevent any rotation of knob 60 during the dispensing or filling strokes, an adjustable setscrew 69 is received within a threaded aperture 71 in casing 10 and is adapted to engage bulbous protrusion 62 of sleeve 54. Thus, once the stroke is adjusted through rotation of knob 60, setscrew 69 is tightened and an accurate dispensing stroke or series of strokes is assured.

The adjustment of shaft 46 is represented by a digital readout mechanism in the form of a numbered wheel assembly generally designated 72. As best shown in FIG. 4, assembly 72 comprises three hollow numbered wheels 74, 76, and 78 adapted to provide a three-digit readout defining units, tens, and hundreds respectively. In the present embodiment, each wheel is provided with 20 digits comprising two sets of consecutive digits from 0–9. Clearly, any number of sets of digits from 0–9 may be provided depending on the size of the digits desired and the diameter of the wheel. Wheels 76 and 78 are provided at their right-hand ends with spur gears 80 and 82 respectively, each having 40 gear teeth. Wheels 74 and 76 are provided at their left-hand ends with gear surfaces 81 and 83 respectively, each defined by two gear grooves 81a, 81b and 83a, 83b, respectively 180° apart. Two floating transfer gears generally designated 86 and 88 are mounted on shafts 90 and 92 respectively, which are in turn received in grooves 94, 96 and 98, on carriage member 84. Floating gears 86 and 88 are each provided with two sets of gear teeth having a 2- to-1 ratio, the gears having the greater number of teeth being designated 86a and 88a, respectively and those having the lesser number (namely one-half) being designated 86b and 88b respectively. As best shown in FIG. 1, carriage 84 with floating gears 86 and 88 mounted thereon is mounted within an appropriate receptacle 100 formed in casing 10 and secured therein by means of setscrew 102. Wheels 76 and 78 are rotatably mounted on sleeve 54, while wheel 74 is press fitted thereon and thus rotatable therewith. As illustrated, carriage 84 is positioned within casing 10 in such a manner that gear surfaces 81 and 83 on wheels 74 and 76 mesh with gear surfaces 88b and 86b respectively and gear surfaces 80 and 82 of wheels 76 and 78 mesh with gear surfaces 88a and 86a respectively.

Casing 10 is provided with a recess generally designated 104 adjacent knob 60, having three circular apertures 106, 108 and 110 aligned respectively with the numbered surfaces of wheels 74, 76 and 78 and adapted to receive three transparent window disks 112, 114 and 116.

The operation of the digital readout assembly is as follows: As the operator rotates knob 60 such rotation is transmitted directly through sleeve 54 to units wheels 74 which, as will be recalled, is press fitted onto sleeve 54 and therefore is fast thereon. The digits are positioned on wheel 74 such that when the digit nine appears through window 112, one of the gear grooves 81a or 81b on gear surface 81 begins to mesh with the teeth in gear surface 88b. As wheel 74 is further rotated, floating gear 88 is rotated an amount equal to one gear tooth on gear surface 88b. This rotation is in turn transmitted through gear surface 88a to wheel 76 which is rotated by two gear teeth (it being recalled that gear surface 88a has twice as many gear teeth as gear surface 88b), or 1/20th of a full revolution of tens wheel 76, thus bringing the next consecutive tens digit into view through window 114. When the tens digit appearing through window 114 reaches 9, the next incremental rotation of wheel 76 will, in turn, be transmitted through floating gear 86 to wheel 78 in an identical manner. In this way, the rotation of knob 60 and thus the axial adjustment of shaft 47 is accurately reflected in a three digit readout through recessed window area 104.

The 10 ml. unit shown in FIG. 2 is identical in all respects with the 1 ml. unit shown and described with respect to FIG. 1 except that the plunger casing 26' is internally threaded at 118 and adapted to be screwed onto an externally threaded portion of casing 10' so as to accommodate the larger diameter plunger 16. The reference numerals in FIG. 2 correspond to those in FIG. 1, for corresponding parts, except that where parts are specifically different, the reference numerals in FIG. 2 are primed.

Both units provide an extremely easy and accurate method of dispensing a given volume of liquid from an associated bureau assembly. The desired volume is set by loosening setscrew 69 on the side of casing 10 and rotating knob 58 until the digital readout corresponds with the desired volume, and then tightening the setscrew 69. For the 10 ml. unit, each digit on the units wheel 74 corresponds to 0.01 ml., while that on the 1 ml. unit corresponds to 0.001 ml. By carefully centering the digit in the window opening 106, the volume can be set to 0.2 of the last digit. To obtain absolute accuracies comparable to reproducibility accuracy, calibration may be made by weighing out quantities of distilled water on an analytical balance, making corrections for calibration of weights and reduction to vacua. Careful technique is required to achieve this degree of precision especially with regard to the operation of the plunger. For high accuracy, slow, uniform motion should be imparted to the plunger and excessive pressure against stop members 18 and 47 should be avoided. The 10 ml. unit can be used for dispensing liquid volumes below 1 ml., but the order of precision is vastly increased by using the 1 ml. unit.

For cleaning purposes, the adapter unit 24 may be disassembled by reversing the assembly procedure previously discussed. The plunger 16, fitting 18 and rod 12 may be removed without unscrewing the plunger casing 26 from the dispenser casing 10. To do this, the handle 14 and fitting 48 at the end of rod 12 may be removed by loosening the setscrew 50. The plunger and attached rod may then be removed by sliding the rod to the left out of casings 10 and 26.

The dispensing unit herein described provides a simple, fast, accurate reagent dispensing apparatus combining the convenience of a direct reading digital indication of volumetric settings with greatly improved output accuracy. Accuracy is greatly enhanced by directly mounting the numbered wheel assembly on the adjusting shaft. In this manner, the inaccuracies inherent in intermediary gearing are eliminated. Moreover, once setscrew 69 is tightened, the relative position of the stop members and the digital readout will be accurately maintained to insure an accurate stroke or series of strokes. For improved precision both the glass barrel 22 and the plunger should be ground and fitted to extremely low tolerances. Reproducibility of the plunger stroke is insured by precision stops at both start and finish of each cycle. Complete control of dimensional tolerances will provide volumetric accuracy of 0.05 percent of total volume in the 10 ml. unit and 0.1 percent in the 1 ml. unit.

While but two embodiments of the present invention have been here specifically disclosed, it will be apparent that many variations may be made in the detailed description thereof, all within the spirit and scope of the invention as defined in the following claims:

I claim:

1. A digital dispenser for dispensing a measured amount of fluid from a cylinder having an opening for dispensing fluid at a first end, comprising a plunger adapted to be slidably and sealingly received within the second end of said cylinder, means for moving said plunger axially toward said first end of said cylinder, means for stopping said plunger after travelling a given distance toward one end of said cylinder, and means for adjusting the position of said stop means so as to vary said given distance, said adjusting means comprising a rotatable, hollow internally threaded adjusting shaft concentrically disposed with respect to said stop means and threadingly engaged therewith, whereby said stop means moves axially along said adjusting shaft as said adjusting shaft is rotated on said stop means, and digital readout means comprising numbered wheel means directly mounted on said adjusting shaft and rotatable therewith, whereby adjustment of said stop means to vary said given distance is digitally represented by said numbered wheel means.

2. The digital dispenser of claim 1, wherein said means for moving said plunger comprises a plunger rod operatively connected to said plunger at one end and having a stop portion from the other end, and said stop means comprises a hollow externally threaded shaft concentrically and slidingly mounted on said plunger rod and adapted to engage said stop portion of said plunger rod when said plunger rod has moved said plunger said given distances.

3. The digital dispenser of claim 2, further comprising adjustable lock means for locking said adjusting shaft against rotation after said stop means has been adjusted.

4. The digital dispenser of claim 2, wherein said numbered wheel means comprises a plurality of numbered wheels, the first of which is rigidly mounted on said adjusting shaft and rotatable therewith, each of the others being rotatably mounted on said adjusting shaft and successively operatively connected to its adjacent numbered wheel by transfer means adapted to transfer rotational motion in a predetermined ratio.

5. The digital dispenser of claim 2, further comprising a hollow casing mounting said plunger rod and said stop means and adapted at one end to operatively engage said second end of said cylinder.

6. The digital dispenser of claim 5, further comprising means for preventing the axial movement of said adjusting shaft with respect to said casing.

7. The digital dispenser of claim 6, wherein said adjusting shaft comprises a hollow shaft concentrically mounted on said stop means and having an internally threaded portion adapted to mate with the external threads on said stop means and having a protrusion, said means for preventing axial movement of said adjusting shaft comprising means on said casing operatively engaging said protrusion.

8. The digital dispenser of claim 7, wherein said numbered wheel means comprises a plurality of numbered wheels, the first of which is rigidly mounted on said adjusting shaft and rotatable therewith, each of the others being rotatably mounted on said adjusting shaft and successively operatively connected to its adjacent numbered wheel by transfer means adapted to transfer rotational motion in a predetermined ratio.

9. The digital dispenser of claim 1, further comprising a hollow casing mounting said plunger rod and said stop means, and adapted at one end to operatively engage said second end of said cylinder.

10. The digital dispenser of claim 9, further comprising means for preventing the axial movement of said adjusting shaft with respect to said casing.

11. The digital dispenser of claim 10, wherein said numbered wheel means comprises a plurality of numbered wheels, the first of which is rigidly mounted on said adjusting shaft and successively operatively connected to its adjacent numbered wheel by transfer means adapted to transfer rotational motion in a predetermined ratio.

12. The digital dispenser of claim 10, further comprising adjustable lock means for locking said adjusting shaft against rotation after said stop means has been adjusted.

13. The digital dispenser of claim 12, wherein said numbered wheel means comprises a plurality of numbered wheels, the first of which is rigidly mounted on said adjusting shaft and rotatable therewith, each of the others being rotatably mounted on said adjusting shaft and successively operatively connected to its adjacent numbered wheel by transfer means adapted to transfer rotational motion in a predetermined ratio.

14. The digital dispenser of claim 10, further comprising means for preventing the rotation of said stop means with respect to said casing.

15. The digital dispenser of claim 14, wherein said means for preventing rotation of said stop means comprises an axially extending keyway on said casing and a key portion on said stop means received within said keyway.

16. The digital dispenser of claim 14, further comprising means fixedly connected to said casing for stopping the travel of said plunger away from said first end of said cylinder.

17. The digital dispenser of claim 9, further comprising means fixedly connected to said casing for stopping the travel of said plunger away from said first end of said cylinder.

18. The digital dispenser of claim 1, wherein said numbered wheel means comprises a plurality of numbered wheels, the first of which is rigidly mounted on said adjusting shaft and rotatable therewith, each succeeding wheel being rotatably mounted on said adjusting shaft and operatively connected to its adjacent wheel by transfer means adapted to transfer rotational motion in a predetermined ratio.